(12) United States Patent
Kenmochi et al.

(10) Patent No.: US 11,826,984 B2
(45) Date of Patent: Nov. 28, 2023

(54) POLYAMIDE-METAL LAMINATES

(71) Applicant: DUPONT POLYMERS, INC., Wilmington, DE (US)

(72) Inventors: Tsunao Kenmochi, Saitama (JP); Haruki Maki, Tochigi (JP)

(73) Assignee: DuPont Polymers, Inc., Wilmington, DE (US)

( * ) Notice: Subject to any disclaimer, the term of this patent is extended or adjusted under 35 U.S.C. 154(b) by 0 days.

(21) Appl. No.: 17/756,367

(22) PCT Filed: Nov. 25, 2020

(86) PCT No.: PCT/US2020/062203
§ 371 (c)(1),
(2) Date: May 24, 2022

(87) PCT Pub. No.: WO2021/108533
PCT Pub. Date: Jun. 3, 2021

(65) Prior Publication Data
US 2023/0001669 A1    Jan. 5, 2023

Related U.S. Application Data

(60) Provisional application No. 62/940,397, filed on Nov. 26, 2019.

(51) Int. Cl.
*B32B 15/088*    (2006.01)
*B32B 1/08*    (2006.01)
(Continued)

(52) U.S. Cl.
CPC .............. *B32B 15/088* (2013.01); *B32B 1/08* (2013.01); *B32B 7/12* (2013.01); *B32B 15/20* (2013.01);
(Continued)

(58) Field of Classification Search
CPC  B32B 15/088; B32B 1/08; B32B 7/12; B32B 15/20; B32B 27/20; B32B 27/34;
(Continued)

(56) References Cited

U.S. PATENT DOCUMENTS 3,461,027 A    8/1969  Plueddemann
3,663,334 A    5/1972  Mueller-Tamm et al.
(Continued)

FOREIGN PATENT DOCUMENTS

CN    1047704072 A    6/2015
JP    S 61152443 A    7/1986
(Continued)

OTHER PUBLICATIONS

English machine translation for JPS61-152443 (Jul. 11, 1986) (Year: 1986).*
International Search Report and Written Opinion for PCT/US2020/062203 dated Feb. 4, 2021, 17 pages.
Chinese Search Report for Application No. 202080082151.X, 3 pages.

*Primary Examiner* — Michael C Miggins
(74) *Attorney, Agent, or Firm* — Dority & Manning, P.A.

(57) ABSTRACT

Novel polyamide-metal laminates which have desirable hydrolysis resistance are provided. The laminates comprise (A) a metal, (B) a tie layer, and (C) a polyamide composition. The tie layer is formed from a composition containing (B1) a polymer containing a comonomer having at least two adjacent carboxylic acid groups and (B2) an amino-silane containing a primary amine and at least one hydroxyl group.

17 Claims, 7 Drawing Sheets

(51) Int. Cl.

| | |
|---|---|
| *B32B 7/12* | (2006.01) |
| *B32B 15/20* | (2006.01) |
| *B32B 27/20* | (2006.01) |
| *B32B 27/34* | (2006.01) |
| *B32B 37/06* | (2006.01) |
| *B32B 37/24* | (2006.01) |
| *B32B 38/16* | (2006.01) |
| *C08L 35/02* | (2006.01) |
| *B32B 38/00* | (2006.01) |
| *C08F 222/06* | (2006.01) |

(52) U.S. Cl.
CPC .............. *B32B 27/20* (2013.01); *B32B 27/34* (2013.01); *B32B 37/06* (2013.01); *B32B 37/24* (2013.01); *B32B 38/162* (2013.01); *C08L 35/02* (2013.01); *B32B 2037/243* (2013.01); *B32B 2038/0064* (2013.01); *B32B 2255/06* (2013.01); *B32B 2255/26* (2013.01); *B32B 2262/101* (2013.01); *B32B 2311/24* (2013.01); *B32B 2377/00* (2013.01); *B32B 2597/00* (2013.01); *C08F 222/06* (2013.01)

(58) Field of Classification Search
CPC ....... B32B 37/06; B32B 37/24; B32B 38/162; B32B 2037/243; B32B 2038/0064; B32B 2255/26; B32B 2262/101; B32B 2311/24; B32B 2377/00; B32B 2597/00; C08L 35/02; C08F 222/06
See application file for complete search history.

(56) References Cited

U.S. PATENT DOCUMENTS

| | | | |
|---|---|---|---|
| 4,690,856 | A | 9/1987 | Ito et al. |
| 4,780,358 | A * | 10/1988 | Ito .................. C09J 177/00 525/283 |
| 4,828,920 | A | 5/1989 | Nakabayashi et al. |
| 5,690,856 | A * | 11/1997 | Milleville ............ C08F 2/40 252/186.25 |
| 8,247,514 | B2 | 8/2012 | Griswold |
| 8,431,225 | B2 | 4/2013 | Imai et al. |
| 2003/0116269 | A1 | 6/2003 | Kohli et al. |
| 2003/0180552 | A1 | 9/2003 | Ooij et al. |
| 2004/0028921 | A1 | 2/2004 | Amouroux |
| 2007/0056469 | A1 | 3/2007 | Ooij et al. |
| 2016/0289497 | A1 | 10/2016 | Lee et al. |
| 2017/0028683 | A1 | 2/2017 | Ha et al. |

FOREIGN PATENT DOCUMENTS

| | | |
|---|---|---|
| JP | 2008238475 A | 10/2008 |
| JP | 2010522654 A | 7/2010 |
| JP | 2013014831 A | 1/2013 |
| JP | 2016117228 A | 6/2016 |
| JP | 2017140768 A | 8/2017 |
| KR | 20020053174 A | 7/2002 |
| WO | 99/55793 A1 | 11/1999 |

* cited by examiner

POLYAMIDE-METAL LAMINATES

CROSS-REFERENCES TO RELATED APPLICATIONS

This application claims priority under 35 U.S.C. §§ 365 and 371 to International Application No. PCT/US2020/062203, filed on Nov. 25, 2020, which in turn claims priority to U.S. Provisional Appln. No. 62/940,397, filed on Nov. 26, 2019, each of which is incorporated herein by reference in its entirety.

OVERVIEW

Several patents and publications are cited in this description in order to more fully describe the state of the art to which this invention pertains. The entire disclosure of each of these patents and publications is incorporated by reference herein.

Described herein are novel polyamide-metal laminates which have desirable hydrolysis resistance and which comprise novel tie layers for adhering the polyamide composition to the metal surface. Also described herein are compositions suitable for forming the tie layers on metals, metal parts having the tie layers, articles comprising said polyamide-metal laminates and processes to prepare these polyamide-metal laminates.

Compositions based on polyamides typically possess desirable chemical resistance, processability and heat resistance properties. This makes them particularly well suited for demanding high performance automotive and electrical/electronics applications such as vehicle radiators and heater hoses. There is a current and general desire in the automotive field to the continued reduction in weight of the various components that comprise automobiles.

U.S. Patent Application Publication No. 2003/0116269 discloses aqueous primer compositions comprising organosilanes for use on metal surfaces to mainly bond two metals to each other. U.S. Patent Application Publication No. 2003/0180552 discloses a method of treating a metal surface with a silane composition to improve adhesion of a polymer to the metal surface. U.S. Patent Application Publication No. 2007/0056469 discloses a method of treating a metal surface with a silane composition to improve adhesion of a polymer to the metal surface. The silane composition comprises a silane coating composition containing at least one water soluble or dispersible silane and a polymeric resin. The polymeric resin is water insoluble and is used as an aqueous dispersion.

Nevertheless, there remains a need for even lighter weight articles used to make components for under-hood applications of vehicles and which comprise fewer parts and are easier to manufacture than currently available automotive components. Direct adhesion of aluminum or other lightweight metals to polyamides would eliminate parts and provide lower weight articles. However, such direct adhesion must be able to withstand the high temperatures found in the under-hood areas of automobiles, especially when the article is exposed to high temperature aqueous ethylene glycol solutions.

DETAILED DESCRIPTION OF THE INVENTION

Abbreviations

Figure 1:
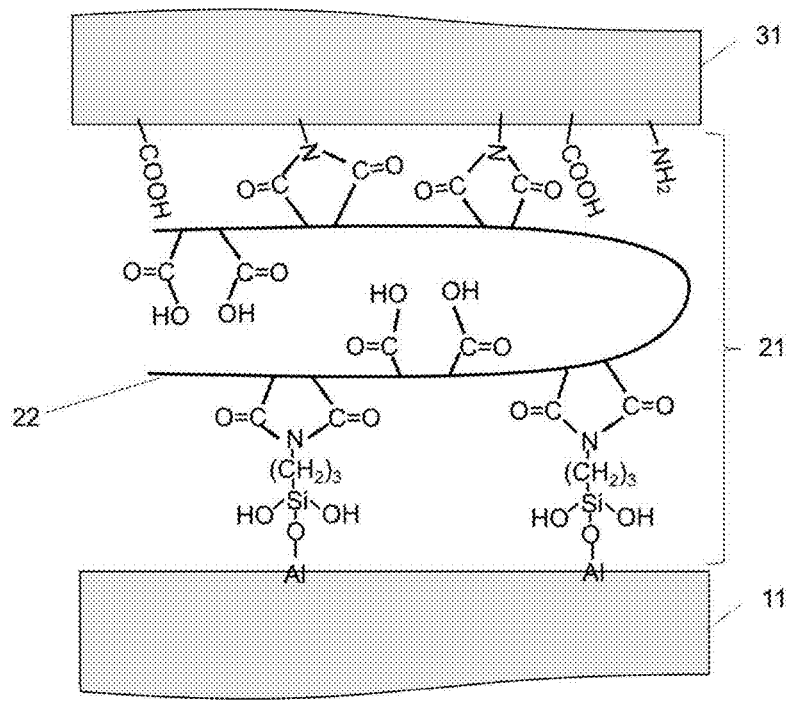
FIG. 1 shows a schematic diagram of an expected chemical structure of metal (A), tie layer (B) and polyamide (C) for laminated polyamide-aluminum.

The claims and description herein are to be interpreted using the abbreviations and definitions set forth below.
"h", "hrs" refers to hours.
"%" refers to the term percent.
"mole %" refers to mole percent.
"wt %" refers to weight percent.
"parts" refers to parts by weight.
"g" refers to grams

Definitions

As used herein, the article "a" refers to one as well as more than one and does not necessarily limit its referent noun to the grammatical category of singular number.

As used herein, the term "article" refers to an item, thing, structure, object, element, device, etc. that is in a form, shape, configuration that is suitable for a particular use/purpose without further processing of the entire entity or a portion of it. An article may comprise one or more element(s) or subassembly(ies) that either are partially finished and awaiting further processing or assembly with other elements/subassemblies that together will comprise a finished article. In addition, as used herein, the term "article" may refer to a system or configuration of articles.

As used herein, the term "solution" refers to aqueous mixtures of ingredients in which the ingredients may be dissolved, suspended, or dispersed in water, alcohol, another suitable liquid, or a combination of two or more suitable liquids.

As used herein, the term "pure aluminum" refers to aluminum metal which comprises at least 99 wt. % aluminum, based on the total weight of the pure aluminum.

As used herein, the term "aluminum alloy" refers to aluminum metal which comprises less than 99 wt. % aluminum, based on the total weight of the alloy, and which comprises one or more other metals and optionally one or more non-metallic elements.

As used herein, the term "tie layer" refers to a composition which bonds metal to polyamide compositions without the need for mechanical bonding, although additional bonding by mechanical means is optional if desired. The tie layer forms a sandwich structure with the tie layer being the middle layer, the metal being one outside or outer layer directly adhered to the tie layer and the polyamide composition forming the other outside layer directly adhered to the tie layer. Stated alternatively, the metal layer is directly adhered to one face of the tie layer and the polyamide composition is directly adhered to the opposite face of the tie layer.

Ranges and Preferred Variants

Any range set forth herein expressly includes its endpoints unless explicitly stated otherwise. Setting forth an amount, concentration, or other value or parameter as a range specifically discloses all possible ranges formed from any possible upper range limit and any possible lower range limit, regardless of whether such pairs of upper and lower range limits are expressly disclosed herein. Compounds, processes and articles described herein are not limited to specific values disclosed in defining a range in the description.

The disclosure herein of any variation in terms of materials, chemical entities, methods, steps, values, and/or ranges, etc., whether identified as preferred or not, of the processes, compounds and articles described herein specifically intends to include any possible combination of that variation with any other materials, methods, steps, values, ranges, etc., that are described herein. Any disclosed combination of features is a preferred variant of the processes, compounds, and articles described herein.

Generally

Described herein are polyamide-metal laminates comprising a polyamide composition bonded to metal using a tie layer of a specific composition. Preferably, said polyamide-metal laminates exhibit desirable hydrolysis resistance when exposed to an ethylene glycol/water solution at 130° C. for 1000 hours compared to the initial bond strength before exposure to the ethylene glycol/water solution.

Also described herein are tie layers which are used to improve bonding of metal to polyamide compositions and processes for preparing these tie layers.

Also preferably, the polyamide-metal laminates comprise (A) a metal, (B) a tie layer formed on the surface of the metal and (C) a polyamide formed on the surface of the tie layer, wherein the tie layer comprises:

B1) a polymer comprising carboxylic acid groups; and
B2) an amino-silane comprising a primary amine and at least one hydroxyl group;

in which at least two carboxylic acid groups in polymer (B1) are adjacent each other, and the molar ratio of the two adjacent carboxylic acid groups in (B1) to primary amine groups in (B2) is from 1:0.8 to 1:14.

Also described herein are compositions comprising (B1) and (B2) described above, metal parts having tie layers (B), processes for preparing the polyamide metal laminates, and articles comprising said polyamide metal laminates.

Polyamide-Metal Laminates

Polyamide-metal laminates as disclosed herein can be used to prepare articles having any shapes such as a polyamide hose (polyamide (C)) bonded to a metal radiator (metal (A)) using tie layer (B). Tie layers (B) disclosed herein can be applied or coated on metal (A) to provide tie/metal laminates. These tie/metal laminates can subsequently be bonded to a polyamide composition to prepare polyamide-metal laminates.

Metal Layer (A)

Metal (A) can be any metal capable of forming a bond with the hydroxyl group of amino silane (B2). Examples of metal (A) include, carbon steel, galvanized steel, stainless steel, steel casting, aluminum, titanium, and alloy thereof. Metal (A) is preferably a lightweight metal such as aluminum or titanium, preferably aluminum. The metal can be pure metal or a metal alloy. The metal alloy may comprise a mixture of metals. Alternatively, one or more metals may be combined with one or more non-metallic elements such as carbon or silicon to form the alloy. When the metal is aluminum, the aluminum content of the aluminum alloy should be at least about 70 weight percent aluminum, preferably at least about 80 weight percent aluminum, and more preferably at least 90 weight percent aluminum.

Metal Surface Cleaning

Before forming tie layer (B) on metal (A), cleaning of the metal surface may or may not be necessary. When metal surface cleaning is needed, methods typically used in the art to remove contaminants and oxidation from the surface of metal can be used. Metal surface cleaning includes both chemical treatments and mechanical methods, and combinations of two or more suitable cleaning methods. Examples of such cleaning methods include, without limitation, polishing; abrading with abrasive material such as sandpaper; atmospheric plasma treatment, corona discharge treatment; shot blasting; washing with cleaner solution, detergent solution, solvent or deionized water; and chemical etching. Solution comprising an abrasive material can be used when polishing metal. Non-limiting examples of abrasive materials include calcium carbonate, sodium bicarbonate, calcium sulfate, magnesium sulfate, and combination thereof. The solution may also include alcohols such as ethyl alcohol, methyl alcohol, and isopropyl alcohol. The cleaner solution preferably contains cationic, anionic, or nonionic surfactants, or a combination of two or more surfactants. The detergent solution may be any detergent or surfactant solution which is capable of removing contaminants on the metal surface. Examples of suitable cleaner solutions are well known in the art.

When the metal is aluminum or aluminum alloys, the aluminum should be cleaned to be able to react with amino silane (B2). Any cleaning methods can be used. Preferable methods to clean aluminum or aluminum alloys are, polishing the surface of aluminum or aluminum alloy by abrading material such as sandpaper in water, or shot blasting. Without being bound by theory, it is considered that the surface of aluminum needs to be cleaned and optionally activated to achieve sufficient hydrolysis resistance to form the polyamide-metal laminates. One example to analyze the surface of aluminum is X-ray Photoelectron Spectroscopy (XPS). Normally, the surface of aluminum or aluminum alloy is oxidized or polluted by oil, thus the signals of carbon and oxygen atoms are observed in addition to the signal of aluminum. To achieve sufficient hydrolysis resistance to form the polyamide-metal laminates, a signal of aluminum analyzed by XPS should be 15% or more, preferably 20% or more. The percentage of the aluminum signal is based on total moles of elements present on the aluminum surface. Alternatively, the percentage is an "atom %" based on the total number of atoms detected in the analysis, after applying relative sensitivity factors and appropriately integrating peak areas of the XPS spectrum. Another example to analyze the surface of aluminum is Time-of-Flight Secondary Ion Mass Spectrometry (TOF-SIMS). Again, without being bound by theory, it is considered that hydroxyl group(s) must be present on the surface of aluminum to achieve sufficient hydrolysis resistance for polyamide-metal laminates. The number of hydroxyl groups is analyzed as aluminum hydroxide signal (Al(OH)$_3$ or AlO(OH)·nH$_2$O) by TOF-SIMS.

Tie Layer (B)

Tie layer (B) which may be used to prepare polyamide-metal laminates described herein comprises polymer (B1) and an amino-silane (B2). Polymer (B1) comprises carboxylic acid groups. Amino-silane (B2) comprises a primary amine group and at least one hydroxyl group in the amino-silane molecule. Tie layer (B) can be a mixture of polymer (B1) and amino-silane (B2), or a reaction product of polymer (B1) and amino-silane (B2). When tie layer (B) is a reaction product, carboxylic acid groups of polymer (B1) react with amino group of amino-silane (B2). In some preferred tie layers, this reaction forms a cyclic imide with a silane group pendant from the imide nitrogen. It is believed that the reaction between the carboxylic acid groups of polymer (B1) and amino group of amino-silane (B2) will occur upon heating, for example, to a temperature of 220 degrees C. or more.

Polymer (B1)

Polymer (B1) used to prepare tie layer (B) comprises carboxylic acid groups. The carboxylic acid groups can be derivatives of carboxylic acids groups such as, without limitation, carboxylic acid salts, alkyl esters, including monoesters and diesters, or a carboxylic acid anhydride. At least two carboxylic acid groups in (B1) must be adjacent each other. Preferably, the adjacent carboxylic acid groups are derived from anhydride groups such as copolymerized units of maleic anhydride, because the anhydride groups provide two adjacent carboxylic acid groups when those are hydrolyzed. The adjacent carboxylic acid groups contribute to forming a cyclic imide structure with the nitrogen atom of the amino group, as described below.

Typically, the polymer (B1) can be prepared by co-polymerization from one or more monomers having ethylenically unsaturated group (B1-a) and one or more monomers having an ethylenically unsaturated group and at least two adjacent carboxylic acid groups, or a derivative thereof (B1-b). The term "adjacent carboxylic acid groups" as used herein refers to a molecule in which at least two carbon atoms are bound directly to each other by a single or double bond, and each of these at least two carbon atoms is substituted with a carboxylic acid group. The monomer (B1-a) may also have a carboxylic acid group. Monomers having ethylenically unsaturated group (B1-a) include, without limitation, unsaturated aliphatic hydrocarbons such as ethylene, propylene, butene, octene and isopropylene; aromatic monomers such as styrene and 4-methylstyrene; acrylic acid; methacrylic acid; acrylates such as acrylic acid salts or esters; methacrylates such as methacrylic acid salts or esters; and combinations of two or more of these. Preferred monomers having dicarboxylic acid groups or derivative thereof (B1-b) include, without limitation, maleic acid, fumaric acid, itaconic acid, citraconic acid, and derivatives such as acid anhydrides, salts, diesters, and monoesters of these acids. Preferred are maleic anhydride and the alkyl monoesters of maleic acid. In the co-polymer of monomer (B1-a) and monomer (B1-b), the preferable molar content of residues of monomer (B1-b) is 10 molar % or more, more preferably 20 molar % or more, further more preferably 40 molar % or more, based on the total number of copolymerized moles of (B1-a) and (B1-b). The content of the two adjacent carboxylic acid groups in polymer (B1) may be 2 weight or more, preferably 5 weight % or more based on the total weight percent of polymer (B1). The remainder of the copolymerized units of Polymer B1 may consist of or consist essentially of up to 90 molar % or more preferably up to 80 molar % or more or of (B1-a).

Polymer (B1) can be prepared by direct polymerization from monomers having dicarboxylic acid groups or derivative thereof (B1-b), such as maleic acid, fumaric acid, and derivatives thereof.

Polymer (B1) may also be prepared by grafting maleic anhydride to the backbone of polymer (B1) and hydrolyzing the anhydride to form two carboxylic acid groups.

Examples of suitable polymers (B1) include, for example, poly(butadiene-maleic acid) copolymers, propylene-maleic acid copolymers, ethylene-maleic acid copolymers, ethylene-maleic anhydride copolymers, propylene-maleic anhydride copolymers, poly-maleic acid, poly(isobutylene-maleic acid) or its hydrolyzate, ethylene-maleic anhydride copolymers or those hydrolyzates, and combinations of two or more of these polymers.

Examples of suitable polymer (B1) in which the carboxylic acid groups are grafted onto the backbone of polymer (B1) include, for example, maleic anhydride grafted onto ethylene octene copolymers, ethylene butene copolymers, ethylene propylene copolymers, and combinations of two or more of these polymers.

Commercially available copolymers which can be used as polymer (B1) of the invention include ZeMac™ E60, E400 and Solution S67025 available from Vertellus and ISO-BAM™ 104 available from Kuraray co., ltd.

Amino-Silane (B2)

Amino-silane (B2) comprises a primary amine group and at least one hydroxyl group in the amino-silane molecule. Amino-silanes (B2) used in tie layer (B) are represented by formula (I):

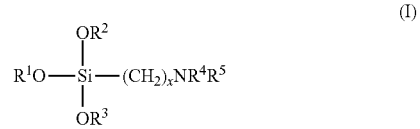

(I)

In the formula (I), $R^1$, $R^2$, and $R^3$ are independently selected from H, linear, branched, or cyclic alkyl groups having 1 to 6 carbon atoms. $R^4$ is H; $R^5$ is independently selected from H and $-(CH_2)_y-NH_2$; and x and y are independently selected integers from 1 to 6, inclusive. At least one of $R^1$, $R^2$, and $R^3$ is H. Preferably, $R^1$, $R^2$, $R^3$, $R^4$, and $R^5$ are H, which is represented by formula (II).

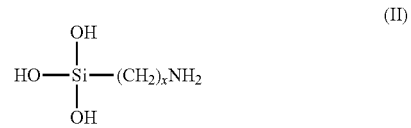

(II)

In the formula (II), x ranges from 1 to 6.

Nonlimiting examples of suitable amino-silanes (B2) include 3-aminopropyltrimethoxysilane, 2-aminoethyltrimethoxysilane, 3-aminopropyltriethoxysilane, 2-aminoethyltriethoxysilane, and N-2-(aminoethyl)-3-aminopropyltrimethoxysilane, and combinations of two or more of these aminosilanes.

Aminosilane may be hydrolyzed in water and become an oligomer. Such oligomer can be used in the invention.

Composition

As mentioned above, tie layer (B) can be a reaction product of polymer (B1) and amino-silane (B2), or an unreacted mixture of these materials. During the preparation of tie layer (B), a composition comprising (B1) a polymer comprising carboxylic acid groups and (B2) an amino-silane comprising a primary amine and at least one hydroxyl group is used. Suitable polymers (B1) and amino-silanes (B2) are described in detail above. The carboxylic acid groups of the polymer (B1) may be present as salts, such as ammonium salts or alkaline metal salts, for example. The composition may further comprise a solvent such as, but not limited to, water or an alcohol/water mixture to form a solvent mixture. The composition may be an emulsion or dispersion comprising amino-silane material and polymer, or the composition may be a solution.

The total concentration of the combination of at least one amino-silane (B2) and at least one polymer (B1) in the composition can range from about 0.5 to 20 weight percent, preferably from 1 to 15 weight percent, and more preferably from 1 to 10 weight percent of the total concentration of polymer (B1) and aminosilane (B2) based on the total weight of the composition.

The composition can further comprise pH adjustor. Examples of pH adjustor include, for example, ammonia, sodium hydroxide, potassium hydroxide, sodium carbonate and 1,8-diazabicyclo[5.4.0]undec-7-ene, the salts of these materials, and mixtures of these materials with their salts. When the composition is a solution, pH of the solution is preferably from 5 to 14, more preferably from 7 to 12, further preferably from 8 to 11. Without being bound by theory, it is considered that the carboxylic acid groups of the polymer (B1) are electrolytically dissociated in alkaline solution; thus, the polymer (B1) is stable in alkaline solution. At the same time, amino group of the amino silane (B2) is ionized in alkaline solution. It is considered that these two groups interact with each other in alkaline solution; thus, the solution is stable when the solution is alkaline. When the solution is in weak acid range (pH is 5-7), a part of carboxylic acid groups of the polymer (B1) are electrolytically dissociated; thus, the solution is also stable for the same reason disclosed above.

Tie Layer B may further comprise one or more additional components. Suitable additional components include, without limitation, reinforcing agents such as carbon black or glass fibers, as described below with respect to polyamide composition C; other polymers such as polyacrylates or ethylene acrylate copolymers; heat stabilizers as described below with respect to polyamide composition C; and optional additives as described below with respect to polyamide composition C.

When a solvent or one or more additional components are present in the tie layer B, they are preferably present at a level of 50 wt % or more, or 20 wt % or more, or 15 wt % or more, or 10 wt % or more, based on the total weight of the composition. Complementarily, the amount of polymer B1 and aminosilane B2 in the composition is 50 wt % or less, or 80 wt % or less, or 85 wt % or less, or 90 wt % or less, based on the total weight of the composition. The sum of the weight percentages of all the components in the composition is 100 wt %. Alternatively, when an optional component is also suitable for use in polymer composition C, it may be present in the same amount that is suitable for use in the polyamide composition C.

Preparation of Tie Layer (B)

Forming Tie Layer (B) on Metal (A)

Figure 3:
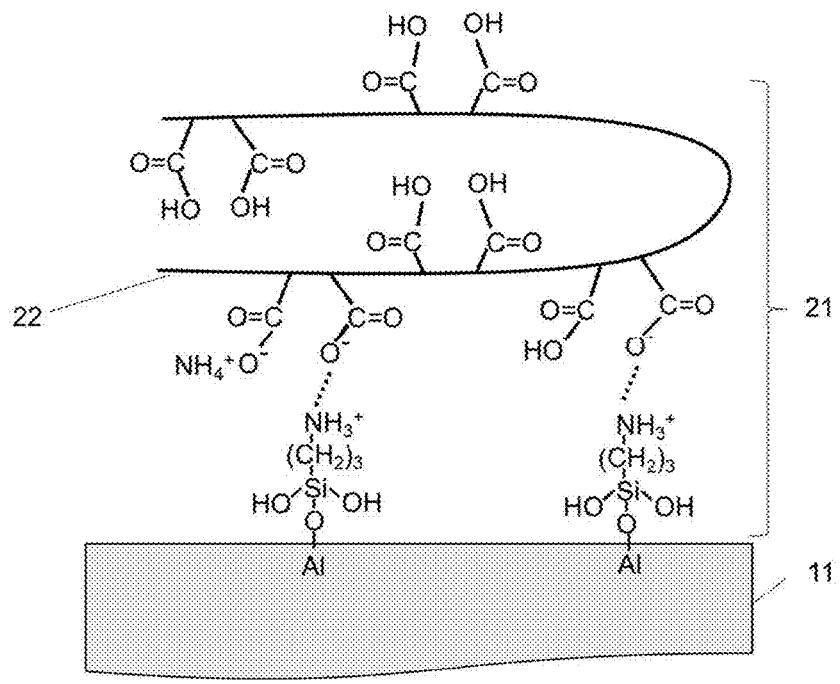
FIG. 3 shows a schematic diagram of another expected chemical structure after tie layer (B) is formed on aluminum (A).

Referring now to the drawings, wherein like reference numerals designate corresponding structure throughout the views, and referring in particular to FIG. 3, these compositions can be applied on metal (A) 11 by any known method such as spraying, roll coating or dipping, then solvent if present is evaporated (i.e. removed) to form tie layer (B) 21 on metal (A) 11. Evaporation of solvent can be conducted under any suitable known condition, such as at room temperature or heating, and under atmospheric pressure or decompression. Without being bound by theory, it is believed that hydroxyl group of the amino-silane interacts with hydroxyl group on the surface of metal when the composition is applied on metal (A) 11, then the amino-silane would bond to the surface of metal (A) 11 by dehydration when the solvent is removed as shown in FIG. 3.

Figure 2:
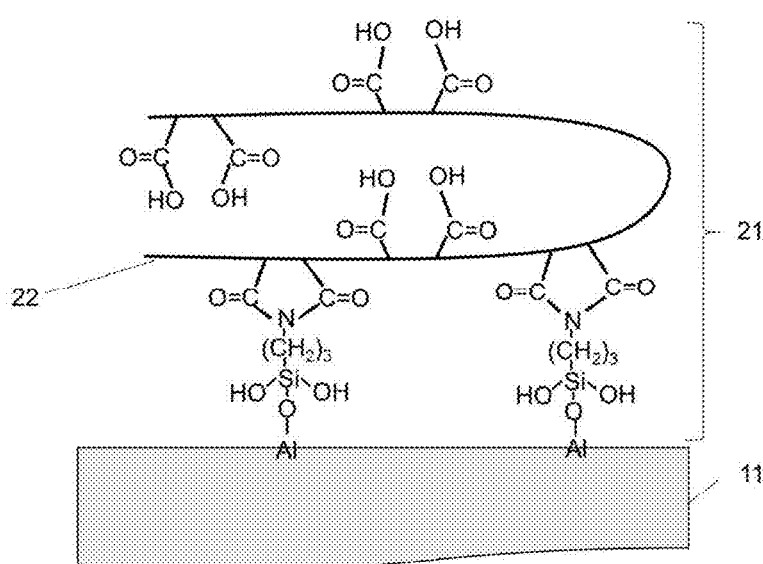
FIG. 2 shows a schematic diagram of an expected chemical structure after tie layer (B) is formed on aluminum (A).

Referring now to FIG. 2, tie layer (B) 21 can optionally be heated after it is applied on metal (A) 11, for example at 100 to 300 degrees C. for 1 to 120 minutes. Without being bound by theory, it is believed that when tie layer (B) 21 is heated, the two adjacent carboxylic acid groups of polymer (B1) chemically react with the primary amine group of amino-silane (B2) to form cyclic imide groups which covalently bond the amino-silane molecule to the polymer molecule. Therefore, if the heating step is added, tie layer (B) 21 is believed to be a reaction product of polymer (B1) and amino-silane (B2), as shown in FIG. 2. However, the step can be omitted because tie layer (B) 21 is heated during laminating step of polyamide (C) as disclosed later.

The molar ratio of the two adjacent carboxylic acid groups in polymer (B1) to primary amine groups in amino-silane (B2) (acid:amine) is from 1:0.8 to 1:12, preferably from 1:0.9 to 1:6, more preferably from 1:0.9 to 1:5, further more preferably from 1:1 to 1:4, and still more preferably from 1:1.3 to 1:4. The molar ratios described herein are based on the fact that one anhydride group provides two carboxylic acid groups when hydrolyzed.

After forming the layer (B) 21 on metal (A) 11, the metal can be used as a metal part which is stable. The metal part having tie layer (B) can be stored, distributed and used as a component ready to laminate with polyamide (C).

Polyamide Composition (C)

Polyamide composition (C) may be any shape, such as a sheet or plate, a tube or hose, or a box. When polyamide composition (C) is a tube or hose, the end of the tube or hose may be placed into contact with a tie layer (B) on metal (A). In other words, polyamide metal laminates are not limited to sheet or plate structures but can be for example a polyamide hose bonded to a tie layer/metal part. Any article having a metal (A) that is bonded to a polyamide composition (C) through a tie layer (B) is within the scope of the present invention, regardless of the shape of the metal (A), the tie layer (B), or the polyamide composition (C), so long as some portion of the article has the structure metal (A)/tie layer (B)/polyamide composition (C), wherein (A), (B), and (C) are contiguous layers. More preferably, metal (A) is in direct contact with tie layer (B), tie layer (B) is in direct contact with polyamide composition (C), and metal (A) and polyamide composition (C) are in direct contact with opposite faces of tie layer (B).

Polyamide Resin (C1)

Polyamide resin (C1) which may be used to prepare polyamide metal laminates described herein are not limited and may preferably be any polyamide having a melting point above about 170° C., preferably above about 180° C. The polyamides are condensation products of one or more dicarboxylic acids and one or more diamines, and/or one or more aminocarboxylic acids, and/or ring-opening polymerization products of one or more cyclic lactams. Suitable cyclic lactams are caprolactam and laurolactam. Polyamides may be fully aliphatic or semi-aromatic.

Examples of polyamides which may be used in the polyamide-metal laminates include poly(tetramethylene hexanediamide) (PA46), poly(ε-caprolactam) (PA 6), poly(hexamethylene hexanediamide/(ε-caprolactam/) (PA 66/6), poly(hexamethylene hexanediamide) (PA 66), poly(hexamethylene hexanediamide/hexamethylene decanediamide) (PA66/610), poly(hexamethylene hexanediamide/hexamethylene dodecanediamide) (PA66/612), poly(hexamethylene hexanediamide/decamethylene decanediamide) (PA66/1010), poly(hexamethylene decanediamide) (PA610), poly(hexamethylene dodecanediamide) (PA612), poly(hexamethylene tetradecanediamide) (PA614), poly(tetramethylene hexanediamide/2-methylpentamethylene hexanediamide) (PA46/D6), poly(tetramethylene hexanediamide/tetramethylene terephthalamide) (PA46/4T), poly(tetramethylene hexanediamide/hexamethylene terephthalamide) (PA46/6T), poly(tetramethylene hexanediamide/2-methylpentamethylene hexanediamide/decamethylene terephthalamide) (PA46/D6/10T), poly(hexamethylene hexanediamide/hexamethylene terephthalamide) (PA66/6T), poly(hexamethylene hexanediamide/hexamethylene isophthalamide/hexamethylene terephthalamide PA66/6I/6T, poly(hexamethylene hexanediamide/2-methylpentamethylene hexanediamide/hexamethylene terephthalamide (PA66/D6/6T), poly(tetramethylene terephthalamide/hexamethylene hexanediamide) (PA4T/66), poly(tetramethylene terephthalamide/ε-caprolactam) (PA4T/6), poly(tetramethylene terephthalamide/hexamethylene dodecanediamide) (PA4T/612), poly(tetramethylene terephthalamide/2-methylpentamethylene hexanediamide/hexamethylene hexanediamide) (PA4T/D6/66), poly(hexamethylene terephthalamide/2-methylpentamethylene terephthalamide/hexamethylene hexanediamide) (PA6T/DT/66), poly(hexamethylene terephthalamide/hexamethylene hexanediamide) PA6T/66, poly(hexamethylene terephthalamide/hexamethylene decanediamide) (PA6T/610), poly(hexamethylene terephthalamide/hexamethylene dodecanediamide) (PA6T/612), poly(hexamethylene terephthalamide/hexamethylene tetradecanediamide) (PA6T/614), poly(hexamethylene terephthalamide/isophoronediamine terephthalamide) (PA6T/IPDT), poly(nonamethylene terephthalamide/nonamethylene decanediamide) (PA9T/910), poly(nonamethylene terephthalamide/nonamethylene dodecanediamide) (PA9T/912), poly(nonamethylene terephthalamide/11-aminoundecanamide) (PA9T/11), poly(nonamethylene terephthalamide/12-aminododecanamide) (PA9T/12), poly(decamethylene terephthalamide/11-aminoundecanamide) (PA 10T/11), poly(decamethylene terephthalamide/12-aminododecanamide) (PA10T/12) poly(decamethylene terephthalamide/decamethylene decanediamide) (PA10T/1010), poly(decamethylene terephthalamide/decamethylene dodecanediamide) (PA10T/1012), poly(decamethylene terephthalamide/tetramethylene hexanediamide) (PA10T/46), poly(decamethylene terephthalamide/ε-caprolactam) (PA10T/6), poly(decamethylene terephthalamide/hexamethylene hexanediamide) (PA10T/66), poly(dodecamethylene terephthalamide/dodecamethylene dodecanediamide) (PA12T/1212), poly(dodecamethylene terephthalamide/ε-caprolactam) (PA12T/6), and poly(dodecamethylene terephthalamide/hexamethylene hexanediamide) (PA12T/66).

Preferred polyamides disclosed herein include PA6T/DT, PA66, PA612, PA610, PA6T/610, PA6T/612, PA6T/IPDT. PA6, PA10, and blends of these.

The amount of polyamide (C1) in polyamide composition (C) is complementary to the amounts of the other components in polyamide composition (C). Stated alternatively, the sum of the weight percentages of all the components in polyamide composition (C) is 100 wt %. Thus, for example, if polyamide composition (C) comprises 70 wt % of a reinforcing agent and 5 wt % of a heat stabilizer, the amount of polyamide (C1) is 25 wt %, based on the total weight of the polyamide composition (C).

Reinforcing Agent (C2)

The polyamide compositions (C) described herein may comprise one or more reinforcing agents (C2). The reinforcing agent is preferably selected from the group consisting of calcium carbonate, glass fibers with circular and noncircular cross-section, glass flakes, glass beads, carbon fibers, aramid fibers, talc, mica, wollastonite, calcined clay, kaolin, diatomite, magnesium sulfate, magnesium silicate, barium sulfate, titanium dioxide, sodium aluminum carbonate, barium ferrite, potassium titanate and mixtures of two or more suitable reinforcing agents (C2). In preferred embodiments, the reinforcing agent is selected from the group consisting of glass fiber having a circular cross section, glass fiber with noncircular cross-section, and aramid fibers. The reinforcing agent may have sizing or coupling agents, organic or inorganic materials that improve the bonding between the reinforcing agent and the polyamide resin.

Polyamide composition (C) described herein may comprise from 0 to 70, preferably 10 to 70, and most preferably 20 to 70 weight percent of one or more reinforcement agents based on the total weight percent of all ingredients in polyamide composition (C).

Heat Stabilizer (C3)

The polyamide composition (C) may comprise heat stabilizer (C3). Organic heat stabilizers are preferred because normally inorganic heat stabilizers provide halogen ions and/or copper ions, those affect for corrosion of metal (A).

Organic heat stabilizers, also referred to as antioxidants, as disclosed herein include hindered phenol compounds, amine based heat stabilizers, and phosphorus based heat stabilizers.

Examples of hindered phenol compounds include tetrakis (methylene (3,5-di-(tert)-butyl-4-hydroxyhydrocinnamate)) methane, available commercially as Irganox™ 1010 from CIBA Specialty Chemicals, Tarrytown, N.Y. and N,N'-hexamethylene bis (3,5-di-(tert)butyl-hydroxyhydro-cinnamamide) also available from CIBA Specialty Chemicals as Irganox™ 1098. Other suitable hindered phenols include 1,3,5-trimethyl-2,4,6tris(3,5-di-(tert)-butyl-4-hydroxybenzyl) benzene and 1,6hexamethylene bis (3,5-di-(tert) butyl4hydroxy hydrocinnamate), both available from CIBA Specialty Chemicals as Irganox™ 1330 and 259, respectively.

Examples of amine-based heat stabilizers include hindered amine light stabilizers (HALS). Preferably, the HALS is a compound derived from a substituted piperidine compound, in particular any compound derived from an alkyl-substituted piperidyl, piperidinyl or piperazinone compound, and substituted alkoxypiperidinyl compounds. Examples of such compounds are: 2,2,6,6-tetramethyl-4-piperidone; 2,2,6,6-tetrametyl-4-piperidinol; bis-(1,2,2,6,6-pentamethyl piperidyl)-(3',5'-di-tert-butyl-4'-hydroxybenzyl) butylmalonate; di-(2,2,6,6-tetramethyl-4-piperidyl) sebacate (Tinuvin® 770, MW 481); oligomer of N-(2-hydroxyethyl)-2,2,6,6-tetramethyl-4-piperidinol and succinic acid (Tinuvin® 622); oligomer of cyanuric acid and N,N-di(2,2,6,6-tetramethyl-4-piperidyl)-hexamethylene diamine; bis-(2,2,6,6-tetramethyl-4-piperidinyl) succinate; bis-(1-octyloxy-2,2,6,6-tetramethyl-4-piperidinyl) sebacate (Tinuvin® 123); bis-(1,2,2,6,6-pentamethyl-4-piperidinyl) sebacate (Tinuvin® 765); Tinuvin® 144; Tinuvin® XT850; tetrakis-(2,2,6,6-tetramethyl-4-piperidyl)-1,2,3,4-butane tetracarboxylate; N,N'-bis-(2,2,6,6-tetramethyl-4-piperidyl)-hexane-1,6-diamine (Chimasorb® T5); N-butyl-2,2,6,6-tetramethyl-4-piperidinamine; 2,2'-[(2,2,6,6-tetramethyl-piperidinyl)-imino]-bis-[ethanol]; poly((6-morpholine-S-triazine-2,4-diyl)(2,2,6,6-tetramethyl-4-piperidinyl)-iminohexamethylene-(2,2,6,6-tetramethyl-4-piperidinyl)-imino) (Cyasorb® UV 3346); 5-(2,2,6,6-tetramethyl-4-piperidinyl)-2-cyclo-undecyl-oxazole) (Hostavin® N20); 1,1'-(1,2-ethane-di-yl)-bis-(3,3',5,5'-tetramethyl-piperazinone); 8-acetyl-3-dothecyl-7,7,9,9-tetramethyl-1,3,8-triazaspiro(4,5)decane-2,4-dione; polymethylpropyl-3-oxy-[4(2,2,6,6-tetramethyl)-piperidinyl]siloxane (Uvasil® 299); 1,2,3,4-butane-tetracarboxylic acid-1,2,3-tris(1,2,2,6,6-pentamethyl-4-piperidinyl)-4-tridecylester; copolymer of alpha-methylstyrene-N-(2,2,6,6-tetramethyl-4-piperidinyl) maleimide and N-stearyl maleimide; 1,2,3,4-butanetetracarboxylic acid, polymer with beta,beta,beta',beta'-tetramethyl-2,4,8,10-tetraoxaspiro[5.5]undecane-3,9-diethanol, 1,2,2,6,6-pentamethyl-4-piperidinyl ester (Mark® LA63); 2,4,8,10-tetraoxaspiro[5.5]undecane-3,9-diethanol,beta,beta,beta',beta'-tetramethyl-polymer with 1,2,3,4-butanetetracarboxylic acid, 2,2,6,6-tetramethyl-4-piperidinyl ester (Mark® LA68); D-glucitol, 1,3:2,4-bis-O-(2,2,6,6-tetramethyl-4-piperidinylidene)-(HALS 7); oligomer of 7-oxa-3,20-diazadispiro[5.1.11.2]-heneicosan-21-one-2,2,4,4-tetramethyl-20-(oxiranylmethyl) (Hostavin® N30); propanedioic acid, [(4-methoxyphenyl)methylene]-,bis(1,2,2,6,6-pentamethyl-4-piperidinyl) ester (Sanduvor® PR 31); formamide, N,N'-1,6-hexanediylbis[N-(2,2,6,6-tetramethyl-4-piperidinyl (Uvinul® 4050H); 1,3,5-triazine-2,4,6-triamine, N,N'''-[1,2-ethanediylbis[[[4,6-bis[butyl(1,2,2,6,6-pentamethyl-4-piperidinyl)amino]-1,3,5-triazine-2-yl]imino]-3,1-propanediyl]]-bis[N',N''-dibutyl-N',N''-bis(1,2,2,6,6-pentamethyl-4-piperidinyl) (Chimassorb® 119 MW 2286); poly[[6-[(1,1,3,33-tetramethylbutyl)amino]-1,3,5-triazine-2,4-diyl][(2,2,6,6-tetramethyl-4-peperidinyl)-imino]-1,6-hexanediyl [(2,2,6,6-tetramethyl-4-piperidinyl)imino]] (Chimassorb® 944 MW 2000-3000); 1,5-dioxaspiro (5,5) undecane 3,3-dicarboxylic acid, bis(2,2,6,6-tetramethyl-4-peridinyl) ester (Cyasorb® UV-500); 1,5-dioxaspiro (5,5) undecane 3,3-dicarboxylic acid, bis (1,2,2,6,6-pentamethyl-4-peridinyl) ester (Cyasorb® UV-516); N-2,2,6,6-tetramethyl-4-piperidinyl-N-amino-oxamide; 4-acryloyloxy-1,2,2,6,6-pentamethyl-4-piperidine. 1,5,8,12-tetrakis[2',4'-bis(1'',2'',2'',6'',6''-pentamethyl-4''-piperidinyl(butyl)amino)-1',3',5'-triazine-6'-yl]-1,5,8,12-tetraazadodecane; HALS PB-41 (Clariant Huningue S. A.); Nylostab® S-EED (Clariant Huningue S. A.); 3-dodecyl-1-(2,2,6,6-tetramethyl-4-piperidyl)-pyrrolidin-2,5-dione; Uvasorb® HA88; 1,1'-(1,2-ethane-di-yl)-bis-(3,3',5,5'-tetra-methyl-piperazinone) (Good-Rite® 3034); 1,1'1''-(1,3,5-triazine-2,4,6-triyltris ((cyclohexylimino)-2,1-ethanediyl)tris(3,3,5,5-tetramethylpiperazinone) (Good-Rite® 3150) and; 1,1',1''-(1,3,5-triazine-2,4,6-triyltris((cyclohexylimino)-2,1-ethanediyl)tris(3,3,4,5,5-tetramethylpiperazinone) (Good-Rite® 3159). (Tinuvin® and Chimassorb® materials are available from Ciba Specialty Chemicals; Cyasorb® materials are available from Cytec Technology Corp.; Uvasil® materials are available from Great Lakes Chemical Corp.; Saduvor®, Hostavin®, and Nylostab® materials are available from Clariant Corp.; Uvinul® materials are available from BASF; Uvasorb® materials are available from Partecipazioni Industriali; and Good-Rite® materials are available from B.F. Goodrich Co. Mark® materials are available from Asahi Denka Co.)

Other specific HALS are selected from the group consisting or di-(2,2,6,6-tetramethyl-4-piperidyl) sebacate (Tinuvin® 770, MW 481) Nylostab® S-EED (Clariant Huningue S. A.); 1,3,5-triazine-2,4,6-triamine, N,N''''-[1,2-ethanediylbis[[[4,6-bis[butyl(1,2,2,6,6-pentamethyl-4-piperidinyl)amino]-1,3,5-triazine-2-yl]imino]-3,1-propanediyl]]-bis[N',N''-dibutyl-N',N''-bis(1,2,2,6,6-pentamethyl-4-piperidinyl) (Chimassorb® 119 MW 2286); and poly[[6-[(1,1,3,33-tetramethylbutyl) amino]-1,3,5-triazine-2,4-diyl][(2,2,6,6-tetramethyl-4-peperidinyl)-imino]-1,6-hexanediyl [(2,2,6,6-tetramethyl-4-piperidinyl)imino]] (Chimassorb® 944 MW 2000-3000).

The concentration of optional heat stabilizer in polyamide composition (C), when present, ranges from about 0.01 to 5, preferably from 0.1 to 4, and more preferably from 0.1 to 2 weight percent, based on the total weight of all ingredients in the polyamide composition (C).

Additives

Optional additives which may be added to polyamide composition (C) include, for example, waxes, ultraviolet stabilizers, colorants, lubricants, and mixtures of these. Optional additives may also include materials which, when added to polyamide composition (C) described herein, result in a polyamide composition (C) which has a coefficient of linear thermal expansion similar to that of metal being used. For aluminum, an example of such an additive is aramid fibers such as DuPont™ Kevlar® aramid fibers.

The concentration of additives in polyamide composition (C), when present, ranges from about 0.01 to 25, preferably from 0.1 to 20 weight percent, based in the total weight of all ingredients in the polyamide composition (C).

Preparation of Polyamide Metal Laminates

Polyamide-metal laminates described herein may generally be prepared by the steps of:
a) forming a tie layer on a metal to provide a metal/tie layer laminate;
b) bonding said metal/tie layer laminate from step a) to a polyamide composition to provide a polyamide metal laminate.

The step a) is same as disclosed above as the description for forming tie layer (B) on metal (A). As mentioned, heating step of tie layer (B) is optional. Without being bound by theory, it is believed carboxylic acid groups or carboxylic acid diads of polymer (B1) react with amino-silane (B2) when tie layer (B) is heated.

There are several practical methods for step (b). A first suitable method is to prepare a shaped polyamide in advance, then bonding it to the surface of tie layer prepared by step (a). This method is also called as welding (method). Specifically, polyamide metal laminates may be prepared by the following procedure.

Polyamide composition (C) may be shaped using any procedure such as molding, extrusion or compression to provide polyamide composition (C) into a desired shape such as a tube or hose. The shaped polyamide composition (C) is placed into contact with a metal-tie layer laminate as disclosed herein. Polyamide composition (C) and metal-tie layer laminate, while in contact with each other, are heated, preferably under pressure, to a temperature of 200 to 350° C. for a time period sufficient to melt polyamide resin (C1) and permit reaction of the polyamide amine groups with the acid groups of tie layer (B). Any welding method can be used, for example, using heating equipment such as oven or hot plate, laser welding, ultrasonic welding, and hot gas welding. Exemplary the condition for hot press is 220 to 320 degrees C. for 1 to 120 seconds at 0.1 MPa or higher. If used, pressure is then released to obtain an article comprising a polyamide-metal laminate.

A second suitable method is feeding a polyamide composition comprising polyamide (C1) and optionally reinforcing agent (C2) and heat stabilizer (C3) in an injection molding equipment, melt-mixing to form polyamide composition (C), then molding polyamide composition (C) directly on the surface of metal-tie layer laminate, preferably by injection molding. Without wishing to be held to theory, it is hypothesized that the polyamide (C1) is melted during injection of polyamide composition (C). Accordingly, it is further hypothesized that the temperature of the tie metal laminate and injected polyamide composition (C) are high enough to react the amine groups of the polyamide (C1) with the acid groups of tie layer (B).

When tie layer (B) is used to bond polyamide composition (C) to metal (A), the resulting polyamide-metal laminates exhibit a combination of desirable bond strength between polyamide composition (C) and metal (A) as well as excellent hydrolysis resistance. Without being bound by theory, it is believed the amine terminal groups of the polyamide bond to the carboxylic acid groups of the polymer to provide imide groups which connect or chemically bond the polyamide molecule to the tie layer.

Polyamide-Metal Laminates

Figure 4:
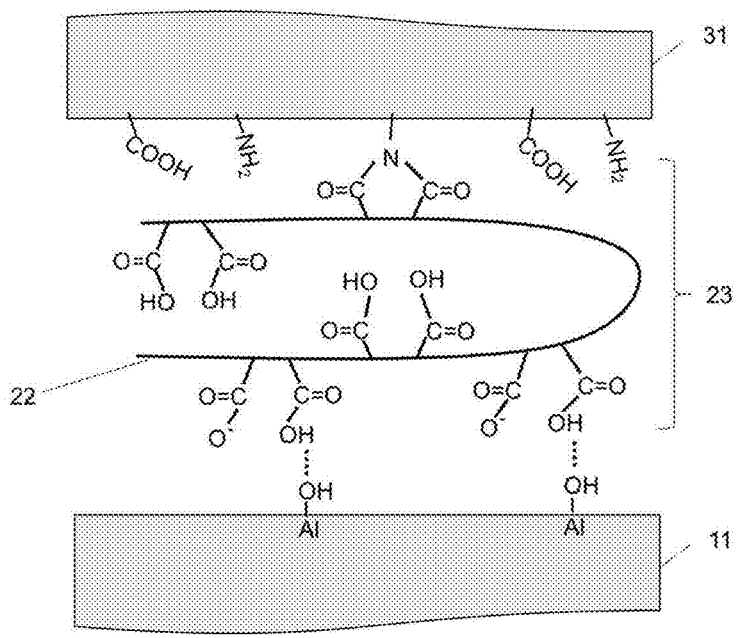
FIG. 4 shows a schematic diagram of an expected chemical structure when amino silane (B2) is not included in tie layer (B) (Comparison)
Figure 5:
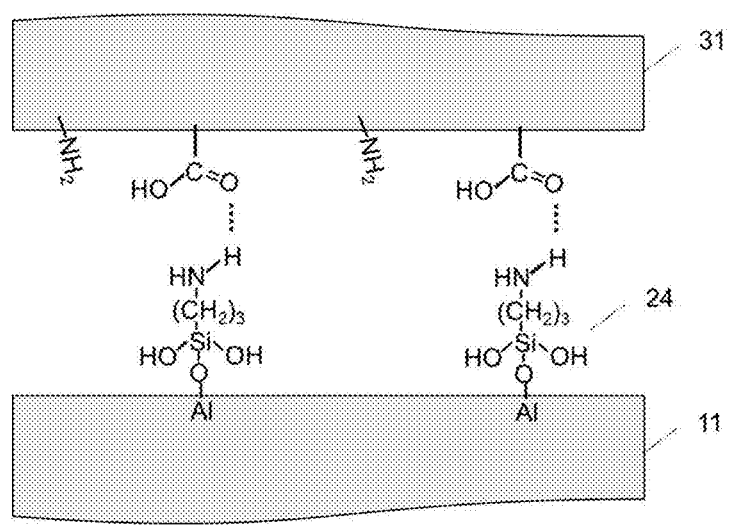
FIG. 5 shows a schematic diagram of an expected chemical structure when carboxylic acid containing polymer (B1) is not included in tie layer (B) (Comparison)

The obtained polyamide-metal laminate bonded by the specific tie layer shows desirable bond strength as well as excellent hydrolysis resistance, greater than a laminate using a conventional surface treatment (amino propyl silane). Especially, the polyamide-metal laminate using tie layer of the invention exhibits desirable hydrolysis resistance when exposed to an ethylene glycol/water solution at 130° C. for 1000 hours compared to the initial bond strength before exposure to the ethylene glycol/water solution. Referring to FIG. 1, the expected structure for polyamide-metal laminate of the invention is depicted. Without wishing to be held to theory, it is believed that silanol group of tie layer 21 reacts with hydroxyl group of metal (ex. aluminum) 11 while two carboxylic acid groups of tie layer 21 form cyclic imide structure with nitrogen atom of amino group of polyamide composition 31. Therefore, aluminum 11 and polyamide composition 31 are strongly bonded by tie layer 21. On the other hand, when conventional surface treatment such as amino propyl silane is used as shown in FIG. 5, the interaction between carboxylic acid group of polyamide composition 31 and amino group of amino-silane is weak especially under the presence of water (hydrolysis). FIG. 4 shows another comparison model when amino-silane is not included in tie layer. Although polyamide composition 31 can be bonded to polymer 23, the interaction between carboxylic acid of polymer 23 and hydroxyl group of aluminum 11 is weak, thus the desirable bond strength between aluminum 11 and polyamide composition 31 can be obtained.

Articles

The article of the invention comprises polyamide-metal laminate disclosed above. The articles can be used for any technologies which require direct adhesion of metals to polyamides. Examples of such technologies include automotive, electronics and construction industries. Especially, the articles are useful for a tube, a hose, a water pump housing, an oil filter housing and transmission housing of automotive technologies.

The following examples are provided to describe the invention in further detail. These examples, which set forth a preferred mode presently contemplated for carrying out the invention, are intended to illustrate and not to limit the invention.

EXAMPLES

The articles that are examples of the invention are identified by "E" in the tables below, and the comparative examples are identified in the tables below by "C".

Materials

In the compounds, processes, and articles exemplified in the tables below, the following materials were used. All percentages are by weight unless indicated otherwise.

Metal Layers (A)
  Metal 1: Aluminum comprising 1.2 to 0.8 weight percent Magnesium, 0.7 weight percent iron, 0.4 to 0.8 weight percent silica, and up to 1.4 weight percent other metals and is available as A6061 of JIS (Japanese Industrial Standards).
  Metal 2: Aluminum comprising 2.2 to 2.8 weight percent Magnesium and up to 1.3 weight other metals and is available as A5052 of JIS.
  Metal 3: Aluminum comprising more than 99.5 weight percent Aluminum and up to 0.5 weight percent other metals and is available as A1050 of JIS.

Polymers (B1)
  Polymer A: Ethylene maleic anhydride copolymer available as ZeMac E60 from Vertellus Specialties Inc., reported to be a 1:1 alternating copolymer of ethylene and maleic anhydride.
  Polymer B: Polybutadiene-maleic acid copolymer available as Poly (Butadiene-Maleic Acid) 42% Solids in water from Polysciences, Inc.

Amino Silanes (B2)
  Silane A: A 30 weight percent aqueous solution of hydrolysate of 3-Aminopropyltrimethoxysilane and available from ShinEtsu Silicone as KBP-90.
  Silane B: An amino-silane coupling agent comprising N-2-(Aminoethyl)-3-aminopropyltrimethoxysilane and available from ShinEtsu Silicone as KBM-603.
  Silane C: An amino-silane coupling agent comprising 3-Aminopropyltriethoxysilane and available from ShinEtsu Silicone as KBE-903.
  Silane D: A 30 weight percent aqueous solution of hydrolysate N-2-(Aminoethyl)-3-aminopropyltrimethoxysilane from ShinEtsu Silicone as KBP-64.

Polyamide Compositions (C)
  Polyamide A (PA-A): A polyamide composition comprising 51 PA66, 13% PA6, 35 weight percent glass fibers, and an organic heat stabilizer with PA66 having a melting point of 260° C. and PA6 having a melting point of 221° C.
  Polyamide B (PA-B): A polyamide composition comprising 66% PA66, 33% glass fibers, and no heat stabilizer, with PA66 having a melting point of 260° C.
  Polyamide C (PA-C): A polyamide composition comprising 66% PA612, 33% glass fibers, and an organic heat stabilizer, with PA612 having a melting point of 218° C.
  Polyamide D (PA-D): A polyamide composition comprising 65% PA612, 33% glass fibers, and no heat stabilizer, with PA612 having a melting point of 218° C.

Polyamide E (PA-E): A polyamide composition comprising 63% PA6T/DT, 35% glass fibers, and an organic heat stabilizer, with PA6T/DT having a melting point of 300° C.

Heat Stabilizers (C3)

HS2-A: An organic heat stabilizer comprising a mixture of Chimasorb 944FDL 0.3%, Irganox1098 0.75%, Ultranox626A 0.3%, wherein the weights are based on the weight of the polyamide composition C.

HS2-B: Organic heat stabilizer from BASF as Irganox® 1098.

Before treatment of the aluminum with a metal treatment solution as disclosed herein, the aluminum surface may be cleaned by one of the following cleaning procedures:

Cleaning Procedures

Procedure A—exposing the aluminum surface to isopropyl alcohol.

Procedure B—polishing the aluminum surface with an abrasive material (sandpaper with 500 grit) to provide a polished aluminum surface followed by exposing the aluminum surface to a cleaning solution and subsequently rinsing the treated aluminum surface with a detergent solution to remove residual cleaning solution.

Procedure C—Blasting the aluminum surface by Aluminum oxide particles (#240) at 0.2 MPa, using Babyblast made from Macoho Co., Ltd.

Procedure D—Irradiating by Ultraviolet (254 nm) at 14 mW/cm² for 5 cm distance, at room temperature (26° C.) for 1 hour.

Welding A (Hot Press Welding)

Figure 6:
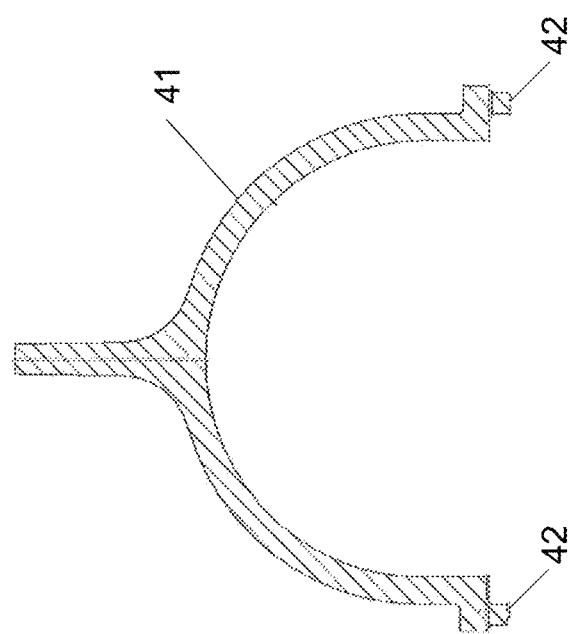
FIG. 6 shows a side view in cross-section of a polyamide cap test sample.
Figure 7:
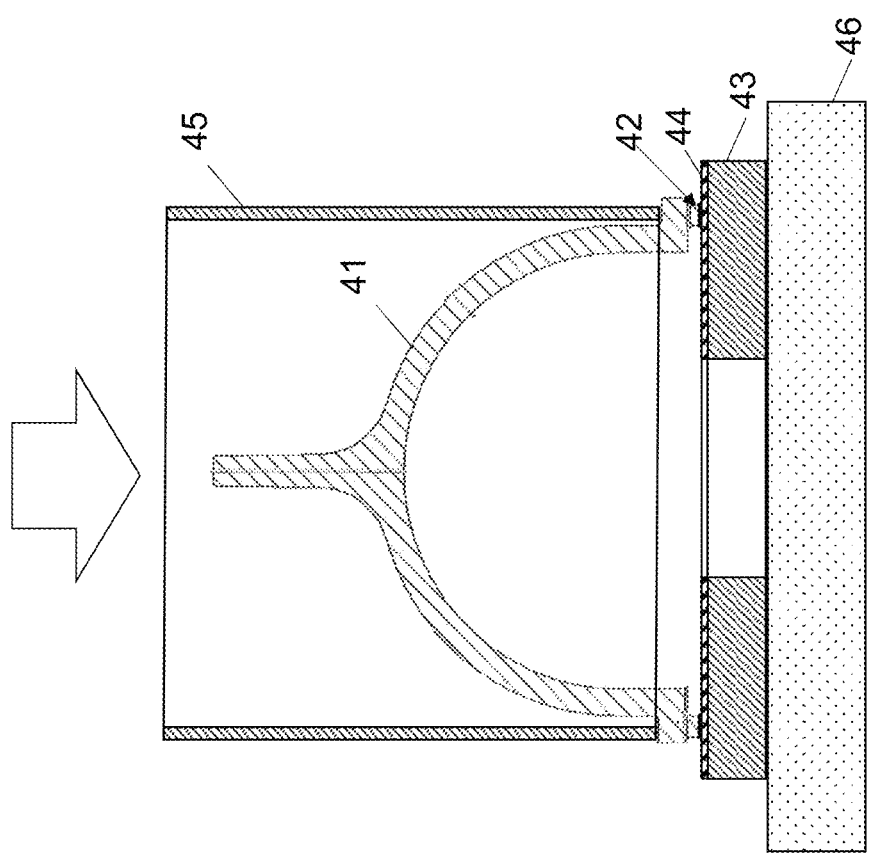
FIG. 7 shows a side-view in cross section of a polyamide cap test sample in a lamination apparatus for lamination to a metal layer via a tie layer to form a polyamide-metal laminate with a tie layer.

Referring now to FIG. 6, a polyamide cap 41 has a cylindrical cross-section in the horizontal plane perpendicular to the vertical plane through which the cross section of the polyamide cap 41 is depicted. This cylindrical section is the welding area 42 through which the polyamide cap 41 will be attached to the metal layer A. Referring now to FIG. 7, an aluminum test plate 43 (50 mm square and 6 mm of thickness) has a circular hole (25 mm) in the center. The aluminum test plate 43 was cleaned and then treated with a metal treatment solution, resulting in tie layer 44 on the metal surface. Polyamide cap test sample 41 was placed in contact with and centered on aluminum plate 43 such that the polyamide cap 41 covers circular hole. The surface area 42 of the polyamide cap 41 in contact with the aluminum plate 43 was approximately 177 mm². The aluminum plate 43 and the cap 41 were put onto hot plate 46 with placing a metal cylinder 45 which transmitted pressure to right above welding area 42. The direction of the pressure is indicated by the arrow. This assembly was hot pressed under 0.3 MPa at 240 to 315 degrees C. for 1 minute, then cooled to the temperature lower than the melting temperature of polyamide composition (C) under the same pressure.

Welding B (Direct Injection Molding)

Figure 9:
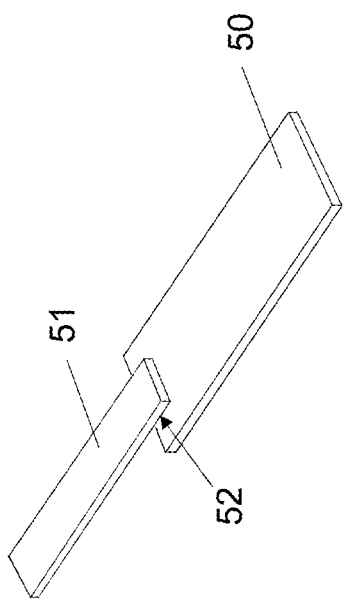
FIG. 9 shows a perspective view of a test sample for determining adhesion strength according to ISO-19095-3.

Referring now to FIG. 9, an aluminum plate 50 with 18 mm of width, 45 mm of length and 2.0 mm of thickness was used as an aluminum test plate. The aluminum plate 50 was cleaned and then treated with a metal treatment solution which deposited a tie layer B on the aluminum plate 50. The aluminum plate 50 was placed into molding tool, then polyamide molding 51 with 10 mm of width, 45 mm of length and 3 mm of thickness was formed on the aluminum plate 50 by direct molding with 10×5 mm overlapped area 52. The set cylinder temperatures in polyamide case are 280 to 300° C., the tool temperature is 120 to 160° C. The heat and cool system "Y-HeaT" from Yamashita Electric Co., Ltd. were used to direct injection molding, heating temperature was 240° C. and cooling temperature was 180° C., Hold pressure was 40 MPa, Hold time was 6 seconds.

Bond Strength Retention Test

Two test specimens were prepared for each polyamide composition and surface treatment solution. One test specimen was exposed to an aqueous ethylene glycol solution heated at 130° C. for 1,000 hours (unless otherwise noted) to observe hydrolysis resistance, and the second test specimen was not exposed to the solution. Bond strength of the both test specimens were measured.

Figure 8:
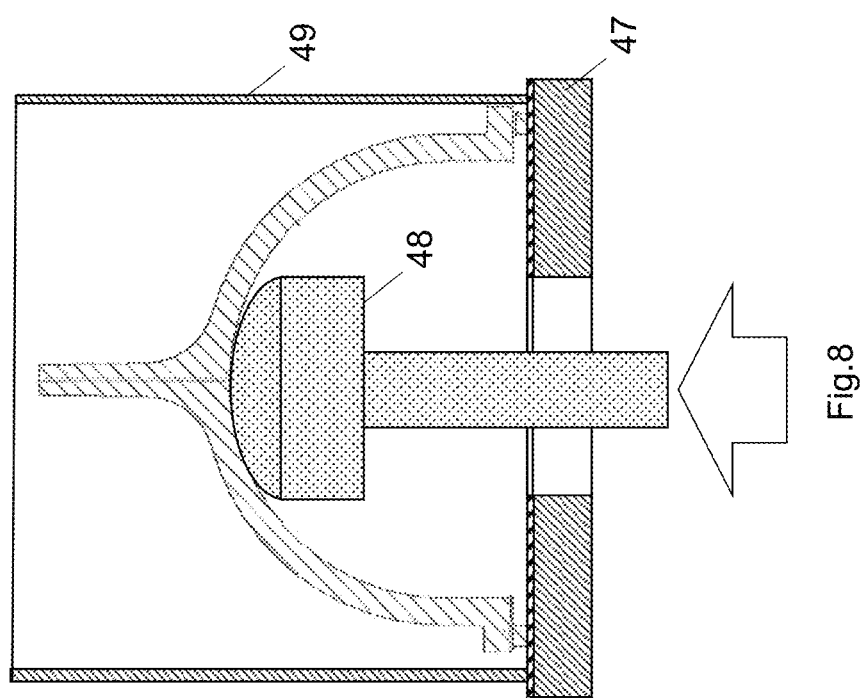
FIG. 8 shows a side-view in cross section of a polyamide-metal laminate with a tie layer in an apparatus for determining the adhesion strength between the polyamide cap test sample and the metal layer.

After exposure to the heated aqueous ethylene glycol solution, the test specimens are tested for bond strength of the shaped polyamide composition to the aluminum plate. Referring now to FIG. 8, for welding A, a cap shaped polyamide 41 was pushed from the inner side of the cap by a piston 48 having 32 mm length and 8 mm in diameter of shaft. The arrow shows the direction of the applied force. The metal plate 47 was held in place with metal cylinder 49 until the polyamide cap 41 was completely separated from the plate 47. For welding B, a test specimen was held in a specimen retainer based on the retainer depicted in FIG. 1 of ISO 19095-3, § 5.2.1.2. The measurements were conducted with 10 mm/min crosshead speed until breaking. Shear stress (MPa) was calculated by dividing breaking load (N) by joint area(mm²). The maximum force required to separate the shaped polyamide composition from the aluminum plate is the bond strength of the test specimen. The bond strength of a test specimen which has not been exposed to an aqueous ethylene glycol solution is compared to the bond strength of a test specimen prepared by an identical process but which has been exposed to an aqueous ethylene glycol solution. The difference between the bond strength of the test specimen after exposure to the aqueous ethylene glycol solution and the bond strength of the test specimen not exposed to the aqueous ethylene glycol solution represents the bond strength retention of the text specimen.

Table 1 shows the ingredients of the polyamide layers used in the examples and comparative examples. Table 2 shows the composition of the solvent solution used to apply tie layer (B) to the aluminum before bonding of the aluminum to the polyamide layer. In Tables 1 and 2, the values are weight percentages, based on the total weight of the polyamide composition in Table 1 and based on the total weight of the metal treatment solution in Table 2. Bond strength retention values for various test specimens are shown in Tables 3 and 4.

TABLE 1

|  | PA-A | PA-B | PA-C | PA-D | PA-E |
|---|---|---|---|---|---|
| PA66 | 51.05 | 66.52 |  |  |  |
| PA6 | 12.77 |  |  |  |  |
| PA612 |  |  | 66.2 | 65.3 |  |
| PA6T/DT |  |  |  |  | 63.25 |
| PA610 |  |  |  |  |  |
| Glass | 35 | 33 | 33 | 33 | 35 |
| HS2-A |  |  |  |  | 0.4 |
| HS2-B | 0.6 |  | 0.3 |  |  |
| Talc |  |  |  |  | 0.35 |
| Lubricant | 0.08 | 0.08 | 0.1 | 0.1 |  |
| Colorant | 0.5 | 0.4 | 0.4 | 1.6 | 1 |

TABLE 2

|  | SS-1 | SS-2 | SS-3 | SS-4 | SS-5 | SS-6 | SS-7 | SS-8 | SS-9 | SS-10 | SS-11 |
|---|---|---|---|---|---|---|---|---|---|---|---|
| Silane-A | 1.5 | 1 | 0.5 | 2.5 | 0.5 | 2.5 | 1.5 | 1.5 | 0 | 0 | 0 |
| Silane B | 0 | 0 | 0 | 0 | 0 | 0 | 0 | 0 | 0 | 2.25 | 0 |
| Silane C | 0 | 0 | 0 | 0 | 0 | 0 | 0 | 0 | 0 | 0 | 2.25 |
| Polymer A | 1.28 | 1.28 | 2.23 | 1.28 | 0.43 | 0.43 | 0 | 0 | 1.28 | 1.28 | 1.28 |
| Polymer B | 0 | 0 | 0 | 0 | 0 | 0 | 1.5 | 0 | 0 | 0 | 0 |
| Ratio (2COOH/NH$_2$) | 2.76 | 4.15 | 14.44 | 1.66 | 2.79 | 0.56 | 2.43 | 0 | — | 0.98 | 0.79 |
| Water | 97.22 | 97.72 | 97.27 | 96.22 | 99.07 | 97.07 | 97 | 98.5 | 98.72 | 96.47 | 96.47 |

SS—solvent solution

TABLE 3

|  | E1 | E2 | E3 | E4 | E5 | E7 |
|---|---|---|---|---|---|---|
| Polyamide | A | B | C | D | E | E |
| HS | HS2-B | none | HS2-B | none | HS2-A | HS2-B |
| Metal | 1 | 1 | 1 | 1 | 1 | 2 |
| SS | SS-1 | SS-1 | SS-1 | SS-1 | SS-1 | SS-1 |
| Cleaning | B | B | B | B | B | B |
| Welding | A | A | A | A | A | A |
| Physical Properties Weld Strength (MPa) | | | | | | |
| Initial | 69.0 | 68.3 | 57.4 | 47.4 | 37.1 | 37.8 |
| 250 hrs | 27.9 | 28.8 | 38.1 | 17.7 | 10.1 | 13.9 |
| 1000 hrs | 4.1 | 6.3 | 22.1 | 8.7 | 7.1 | 7.7 |
| % WS retention | 8.3 | 9.3 | 38.4 | 18.3 | 19.1 | 20.4 |

Table 3 shows that the tie layer improves the hydrolysis resistance between the shaped polyamide composition and aluminum. See also the results obtained for Comparative Example C10, below. Desirable bond strength retention is obtained when aliphatic polyamides are used. PA 66 or a blend of PA66 and PA 6 are used for E1 and E2 respectively. PA612 is used in E3 and E4. E5 uses a semi-aromatic polyamide, PA6T/DT, and articles prepared from this polyamide using the tie layers disclosed herein also exhibits desirable bond strength retention properties.

Table 3 also shows the effect various heat stabilizers have on the bond strength retention of the polyamide compositions to aluminum. These Examples (E1-E7) show that the resulting bond strength retention between the shaped polyamide composition and aluminum after exposure of the article to an ethylene glycol/water solution at 130° C. for 1000 hours is at least 7.1 percent.

Table 4 shows the effect the ratio of amino-silane material to polymer in the metal treatment solution has on bond strength retention. In C8 the ratio of amino-silane material to polymer is about 1 to 14.4, which is outside the desired range of 1 to 0.8 to 1 to 12, resulting in a bond strength retention of less than 1 percent.

Table 4 also shows how solvent solutions comprising various amino-silane materials and polymers have on the effectiveness of such metal treatment solutions on the retention of bond strength of shaped polyamide compositions to aluminum. The solvent solution of E11 comprises a polybutadiene-maleic acid copolymer. This solvent solution provides desirable bond strength retention between aluminum and a shaped polyamide composition showing that both acid and anhydride-based copolymers may be used to prepare the solvent solutions described herein.

The solvent solution used in C10 does not comprise a polymer. The solvent solution used in C11 does not comprise an amino-silane material. In both comparative examples the desired bond strength retention is not obtained. C12 comprises N-2-(Aminoethyl)-3-aminopropyltrimethoxysilane as the amino-silane material and the resulting article does not exhibit the desired bond strength retention.

C9 shows the effect the ratio of amino-silane material to polymer in the metal treatment solution has on bond strength retention. In C9 the ratio of amino-silane material to polymer is about 5.8 to 1, which is outside the desired range of 3 to 1 to 0.8 to 8, resulting in a bond strength retention of less than one percent.

TABLE 5

|  | E13 | E14 | E15 | C13 |
|---|---|---|---|---|
| Polyamide | A | A | EA | A |
| HS | HS2-B | HS2-B | HS2-B | HS2-B |

TABLE 4

|  | E8 | C8 | E9 | E10 | C9 | E11 | C10 | C11 | C12 | E12 |
|---|---|---|---|---|---|---|---|---|---|---|
| Polyamide | E | E | E | E | E | E | E | E | E | E |
| HS | HS2-B | HS2-B | HS2-B | HS2-B | HS2-B | HS2-B | HS2-B | HS2-B | HS2-B | HS2-B |
| Metal | 1 | 1 | 1 | 1 | 1 | 1 | 1 | 1 | 1 | 1 |
| SS | SS-2 | SS-3 | SS-4 | SS-5 | SS-6 | SS-7 | SS-8 | SS-9 | SS-10 | SS-11 |
| Cleaning | B | B | B | B | B | B | B | B | B | B |
| Welding | A | A | A | A | A | A | A | A | A | A |
| Physical Properties Weld Strength (MPa) | | | | | | | | | | |
| Initial | 40.6 | 43.7 | 43.4 | 41.2 | 10.8 | 42 | 22 | 38.3 | 27.8 | 40.2 |
| 250 hrs. | 15.4 | 17.1 | 15.8 | 17.0 | 0 | 14.4 | 0 | 0 | 0 | 13.6 |
| 1000 hrs. | 7.8 | 0.1 | 8.1 | 6.7 | — | 7.1 | — | — | — | 7.1 |
| % retention | 19.1 | 0.2 | 18.7 | 16.3 | — | 17.0 | — | — | — | 17.7 |

TABLE 5-continued

| Metal | 1 | 1 | 1 | 1 |
|---|---|---|---|---|
| SS | SS-1 | SS-1 | SS-1 | SS-1 |
| Cleaning | C | D | B | A |
| Welding | A | A | B | A |
| Physical Properties Weld Strength (MPa) | | | | |
| Initial | 69.0 | 72.2 | 56.4 | 3.2 |
| 250 hrs | 27.9 | 26.7 | 19.7 | 0 |
| % WS retention | 40 | 37 | 35 | — |

Table 5 shows the effect of different cleaning methods and welding process (direct injection molding). Referring to Examples 13, 14 and Comparative example 13, cleaning procedure A does not achieve good bond strength. Referring to Example 15, polyamide-metal laminate formed by direct injection molding (Welding B) shows excellent hydrolysis resistance same as the samples formed by hot press molding (Welding A).

Surface Analysis of Aluminum Plate

The surface of Aluminum plate was analyzed by XPS or TOF-SIMS after cleaning process was conducted. Procedure B or D disclosed above was elected. The plate for Comparative Example 14 (C14) was wiped by cloth dipped in oil after the surface was cleaned by Procedure B. After the surface analysis, polyamide was laminated same as Example 1. Bond strength and hydrolysis resistance were analyzed.

XPS measurement QuanteraSXM from PHI co., inc., X ray source: Al(1486.6 eV), detective area: ø100 micro meter, detective depth 4~5 nm, measuring mode: wide scan: Al2p, O1s, C1s, each element signal percentage were determined by curve fitting of peak area.

TOF-SIMS: Machine:, TOF.SIMS5-300 from IONTOF GmbH, Test conditions: primary ion: Bi, the analytical area: 300 micro meter. Mass analyzer: Time of flight mass spectrometer, each mass fragment were determined by comparison with standard sample of Al, $Al(OH)_3$, $Al_2O_3$ or $AlO(OH)_n H_2O$ data.

TABLE 6

| | | E16 | C14 | C15 | C16 | E17 |
|---|---|---|---|---|---|---|
| Metal | | 1 | 3 | 3 | 3 | 3 |
| Cleaning | | B | B + oil pollution | — | — | D |
| XPS Signals (%) | Al | 21.6 | 8.7 | 15 | — | — |
| | O | 49.5 | 22.2 | 45.1 | — | — |
| | C | 27.7 | 67.4 | 30.9 | — | — |
| TOF-SIMS | Al(OH)3 (137 m/z) | Y | Y(after wipe with ethanol) | N | N | N |
| | AlO(OH)nH2O (103.119 m/z) | Y | Y(after wipe with ethanol) | N | Y | Y |
| | Al2O3 (102, 118 m/z) | N | N | N | Y | Y |
| | AlPO4 (199, 219, 245 m/z) | N | N | Y | N | N |
| Strength | | OK | NG | NG | NG | OK |
| Physical Properties Weld Strength | Initial | 69.3 | 37.9 | 0 | 0 | 65.8 |
| | 250 hrs | 27.6 | 0 | 0 | 0 | 24.3 |

Table 6 shows the effect of aluminum surface condition. Referring to E16 and C14, oil contamination reduces bonding strength even after the same surface cleaning B. Referring to C15 and E18, surface cleaning such as polishing and UV/Ozone treatment is necessary for good bonding strength and these effectiveness might be detected with fragment of $Al(OH)_3$ or partially hydroxide aluminum compound such as $AlO(OH)_n H_2O$ by TOF-SIMS.

TABLE 7

| | SS-12 | SS-13 | SS-14 | SS-15 | SS-16 | SS-17 | SS-18 | SS-19 | SS-20 | SS-21 |
|---|---|---|---|---|---|---|---|---|---|---|
| Silane-A | 2 | 1.9 | 1.84 | 1.72 | 0.9 | 0.75 | 0.6 | 0.5 | 0.4 | 0 |
| Silane D | 0 | 0 | 0 | 0 | 0 | 0 | 0 | 0 | 0 | 1.5 |
| Polymer A | 0.78 | 0.88 | 0.94 | 1.06 | 1.88 | 2.03 | 2.18 | 2.28 | 2.30 | 1.28 |
| Ratio (2COOH/NH2) | 1.26 | 1.50 | 1.65 | 2.00 | 6.76 | 8.77 | 11.77 | 14.77 | 18.92 | 3.70 |
| Water | 97.22 | 97.22 | 97.22 | 97.22 | 97.22 | 97.22 | 97.22 | 97.22 | 97.3 | 97.22 |

All values in weight percent
SS—solvent solution

TABLE 8

| | E18 | E19 | E20 | E21 | E22 | E23 | E24 | E25 | E26 | E27 |
|---|---|---|---|---|---|---|---|---|---|---|
| Polyamide | A | A | A | A | A | A | A | A | A | A |
| HS | HS2-B | HS2-B | HS2-B | HS2-B | HS2-B | HS2-B | HS2-B | HS2-B | HS2-B | HS2-B |
| Metal | 3 | 3 | 3 | 3 | 3 | 3 | 3 | 3 | 3 | 3 |
| SS | SS-12 | SS-13 | SS-14 | SS-15 | SS-16 | SS-17 | SS-18 | SS-19 | SS-20 | SS-1 |
| Cleaning | B | B | B | B | B | B | B | B | B | B |
| Welding | A | A | A | A | A | A | A | A | A | A |
| Physical Properties Weld Strength (MPa) | | | | | | | | | | |
| Initial | 50.6 | 63.8 | 68.9 | 67.7 | 63.0 | 68.3 | 67.6 | 68.5 | 66.1 | 66.6 |
| 250 hrs | 13.8 | 20.8 | 24.7 | 27.8 | 20.9 | 24.0 | 21.8 | 13.8 | 10.3 | 27.0 |
| % WS retention | 27 | 33 | 36 | 41 | 33 | 35 | 32 | 20 | 16 | 41 |

For further clarification of the molar ratio of amino-silane material and polymers, the retention of bond strength after exposure of the article, which is prepared with shaped polyamide (PA66) and aluminum by hot press welding (welding B), to an ethylene glycol/water solution at 130° C. for 250 hours, had been measured in several solvent solutions.

Table 7 shows how solvent solutions comprising various ratio of amino-silane materials and ethylene maleic co-polymers.

In E18-E27 the ratio of amino-silane material to polymer is about 1 to 19, resulting in desired initial bond strength of more than 50 MPa.

Moreover, in E19-E24 the molar ratio of amino-silane to polymers is about 1:1.3 to 1:4 show excellent bond strength retention after exposure of the article to an ethylene glycol/water solution at 130° C. for 250 hours is at least 20 MPa.

TABLE 9

|  | E28 | E29 | C17 |
|---|---|---|---|
| Polyamide | A | A | A |
| HS | HS2-B | HS2-B | HS2-B |
| Metal | 3 | 3 | 1 |
| SS | SS-21 | SS-1 | SS-8 |
| Cleaning | B | B | B |
| Welding | A | A | A |
| Physical Properties Weld Strength (MPa) | | | |
| After exposed to 90° C. water, 96 hrs | 35.8 | 35.5 | 0 |
| Hydrolysis Resistance | OK | OK | NG |

Table 9 shows the welding strength after exposed to 90° C. water for 96 hours. E28 which uses SS-21 comprising polymer D, the hydrolysate of diamine type of amino-silane, and polymer A showed excellent bond strength, while C17 which uses SS-8 consisting of only amino-silane, showed 0 MPa after the exposure. It can be seen that the diamine type of amino-silane which has terminal —NH2 group can also be effective to achieve good hydrolysis resistance, when hydrolyzed.

While certain of the preferred embodiments of the present invention have been described and specifically exemplified above, it is not intended that the invention be limited to such embodiments. Rather, it is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

The invention claimed is:

1. A metal part having a tie layer (B) on the surface of a metal layer (A), in which the tie layer (B) comprises:
B1) a polymer comprising carboxylic acid groups and
B2) an amino-silane comprising a primary amine and at least one hydroxyl group;
in which at least two carboxylic acid groups in polymer (B1) are adjacent each other, and the molar ratio of carboxylic acid groups in (B1) to primary amine group in (B2) is from 1:0.8 to 1:12.

2. A polyamide-metal laminate comprising the metal part of claim 1, and further comprising (C) a polyamide composition formed on the surface of the tie layer.

3. The polyamide-metal laminate of claim 2, wherein the content of the adjacent two carboxylic acid groups in polymer (B1) is 2 weight % or more based on the total weight % of polymer (B1).

4. The polyamide-metal laminate of claim 2, wherein polymer (B1) comprises one or more polymers selected from the group consisting of poly(butadiene-maleic acid) copolymers, propylene-maleic acid copolymers, ethylene-maleic acid copolymers, ethylene-maleic anhydride copolymers, propylene-maleic anhydride copolymers, ethylene-maleic anhydride copolymers, polymaleic acid(s), maleic anhydride grafted ethylene octene copolymers, maleic anhydride grafted ethylene butene copolymers, and maleic anhydride grafted ethylene propylene copolymers.

5. The polyimide-metal laminate of claim 2, wherein amino-silane (B2) is represented by the formula (I):

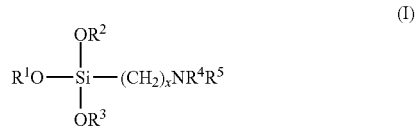

where $R^1$, $R^2$, and $R^3$ are independently selected from H, C1 to C6 linear, branched, or cyclic alkyl groups; $R^4$ is H; $R^5$ is independently selected from H and —$(CH_2)_y$—$NH_2$; x and y independently range from 1 to 6; and at least one of $R^1$, $R^2$, and $R^3$ is H.

6. The polyimide-metal laminate of claim 2, wherein the metal layer (A) is aluminum.

7. The polyimide-metal laminate of claim 6, wherein the aluminum has hydroxyl groups on the surface of the aluminum.

8. A composition suitable for use in forming the tie layer of the metal part of claim 1, said composition comprising;
B1) the polymer comprising carboxylic acid groups,
B2) the amino-silane comprising a primary amine and at least one hydroxyl group and
B3) a solvent.

9. The composition of claim 8, wherein its pH is 5 or more.

10. The composition of claim 8, wherein the solvent is water.

11. A method to laminate a polyamide on the surface of the metal part of claim 1, wherein the metal part is aluminum, comprising the steps of:
(i) preparing an aluminum part in which the surface of the aluminum is cleaned,
(ii) applying a composition to form a tie layer on the surface of the aluminum part, said composition comprising
B1) a polymer comprising carboxylic acid groups,
B2) an amino-silane comprising a primary amine and at least one hydroxyl group, and
B3) a solvent;
wherein at least two carboxylic acid groups in the polymer are adjacent each other, and the molar ratio of carboxylic acid groups in the polymer to primary amine group in the amino-silane is from 1:0.8 to 1:12; then (iii) laminating a polyamide composition on the tie layer under heating at a temperature that is at least the temperature at which the polyamide melts.

12. The method of claim 11, wherein the solvent is water.

13. The method of claim 11, further comprising the step of evaporating the solvent before laminating the polyamide composition.

14. An article comprising the polyamide-metal laminate of claim 2.

15. The article of claim 14 selected from the group consisting of a tube, a hose, a water pump housing, an oil filter housing and a transmission housing.

16. An article comprising the metal part of claim 1.

17. The article of claim 16, selected from the group consisting of a tube, a hose, a water pump housing, an oil filter housing and a transmission housing.

* * * * *